3,234,086
ANTIBIOTIC BLOAT CONTROL COMPOSITION AND METHOD OF USING SAME
Paul A. Hartman and Norman L. Jacobson, Ames, Iowa, and Richard H. Johnson, Palo Alto, Calif., assignors to Iowa State University Research Foundation, Inc., Ames, Iowa, a corporation of Iowa
No Drawing. Filed May 12, 1961, Ser. No. 109,512
14 Claims. (Cl. 167—53)

This invention relates to a bloat control preparation and method. The preparation and method of this invention have particular utility with domestic ruminants such as cattle and sheep.

The present application is a continuation-in-part of our copending application Serial No. 863,272, filed December 31, 1959, now abandoned.

Bloat is an affliction of livestock occurring in many parts of the world. The term usually refers to domestic ruminants, particularly the bovine and ovine species. Ordinarily, bloat is characterized by an accumulation of gas and foam within the rumen or first compartment of the stomach in sufficient quantity that the normal pressure within the rumen is exceeded and distention of the rumen results. The distention of the rumen can be observed exteriorly as a swelling of the abdomen, particularly on the left side. The extent of the distention increases with the severity of the condition. As seen in cattle, the first sign of boat is generally a slight puffiness in the left paralumbar fossa. With increasing severity, the distention of the left paralumbar fossa becomes more marked, and eventually the right side of the animal becomes distended also. The skin becomes tight and drum-like to the touch (the term "tympanites," often used to describe the syndrome, comes from a Greek phrase meaning "drum-like"). The animal becomes restless and may become extremely nervous and excited if disturbed. As internal pressure increases still further, defecation and urination are frequent, incoordination is noted, the anus protrudes, and symptoms of respiratory distress appear. In the terminal stages, there is extreme abdominal distention, severe respiratory distress, cyanosis, prostration and death unless treated. One factor contributing to the seriousness of the condition is that the amount of time elapsing between the first and last states described above can be as little as ten to fifteen minutes.

Under normal conditions on the farm, the husbandman cannot afford a constant watch on a herd of grazing animals, particularly since bloat is often sporadic in nature, not occurring for a considerable time and then striking with no warning. Even when the herd is under constant surveillance, it may be difficult to drive animals that are bloated to a place where they can be restained and treated in time. Where adequate facilities for treatment are readily available, the tendency of otherwise docile animals to become extremely nervous and unmanageable may still make treatment impossible. A further complication is the fact that most of the less drastic treatments (from the standpoint of undesirable side effects on the animal) are relatively ineffective in severe cases. In fact, the only relatively sure treatment involves an emergency rumenotomy, which at best requires a period of convalescence and at worst can result in peritonitis and death from secondary causes. Damage resulting from bloat is not confined to death losses (although these are the usual data reported in statistical studies on the subject). Uncertainties involved often cause much inconvenience and concern to the farmer. Furthermore, there are additional losses due to impaired production of meat and milk in animals afflicted with bloat. Another substantial loss occurs indirectly since farmers often refrain from the use of legumes (which are high yielding nutritious) because of the risk of bloat.

Bloat as it occurs during the consumption of f legumes or the feeding of finely-ground grains is cha terized by the development of a stable foam within rumen which, if unrelieved, can result in the serious c plications mentioned above. In large part, the incr in bloat in recent years has probably been due to cha in management and feeding practices and a great incr in the acreage of legumes, alfalfa and ladino clover in ticular.

In the past, attempts have been made to prevent l through pasture management, grazing control, feedin dry roughage and the administration of anti-foal agents or antibiotics. None of these expedients proven practical.

Some attempts have been made to employ antibi for the prevention and treatment of bloat in rumin Heretofore, however, the experimental results with biotics for bloat prevention have been relatively ul cessful. While some antibiotics have been reporte decreasing the incidence of bloat for a week or two, control has not been achieved over any extended p of time such as would be necessary under practical ditions of ruminant management where the animal eating a bloat-inducing diet. As a minimum, the biotic preparation should be capable of controlling in the animals receiving the preparation for three or weeks, and preferably for as long as two to three mc From the standpoint of availability and cheapness, cillin would be a desirable antibiotic for use in contri bloat, but, unfortunately, this antibiotic is effectiv only relatively short periods of time, usually less two weeks.

It is, therefore, a principal object of this inventi provide a novel bloat control preparation and me which will appreciably extend the effective period of control, and which are adapted for practical comm application. Further objects and advantages will be cated in the following detailed specification.

This invention is based in part on the discovery the combination of penicillin with a macrolide anti is much more effective in preventing and controlling than penicillin alone. In other words, this inve; among other things, contemplates the use of an anti preparation containing both penicillin and a mac antibiotic, and the administration of such preparatic ruminants during periods in which they are eating inducing diets. Apparently, there is a synergistic ; between penicillin and macrolide antibiotics with r to bloat control. Such synergism is manifested be penicillin and various macrolide antibiotics such as e mycin, tylosin, and the like.

This invention is also based on the discovery th synergistic action of the antibiotic preparation i ther enhanced by employing both erythromycin anc sin in combination with penicillin. For reasons no understood, the combined administration of pen erythromycin, and tylosin gives a much more efi and longer period of control than when the same biotics are administered alternately or sequentiall;

For the purpose of the present invention, the r proportions of the other synergistic antibiotics to p lin are of considerable importance. Preferably, f to 3 parts by weight of the macrolide antibiotic ployed per part of penicillin. For example, when cillin, erythromycin, and tylosin are used in combii it is preferred to employ from 1 to 3 parts by of both erythromycin and tylosin per part of pen As a minimum, at least .5 part by weight of each i lide antibiotic should be used per part of penicilli the maximum is about 5 parts per part of penicilli the oral administration of the preparations of this
[composi]tion to cattle, it is preferred to administer from 10
[to 10]0 milligrams (mg.) of penicillin per animal, to-
[gethe]r with from 20 to 200 mg. of each macrolide anti-
[biotic], such as erythromycin and/or tylosin. The prep-
[arati]ons should be administered in these amounts at
[frequ]ent intervals. For example, the preparations may
[be gi]ven daily or at least once every two or three days.
[Best] results are achieved where the antibiotic preparation
[is co]mbined with a feed material which is administered
[with]in relatively uniform amounts over the period in
[whic]h the animals are susceptible to bloat. However,
[other] procedures for oral administration can be used,
[such] as the incorporation of the antibiotic preparation in
[the d]rinking water for the animals, salt or mineral mix-
[ture f]or the animals, etc.
[W]here the preparation and method of this invention
[is u]sed with sheep, the amount of the antibiotics ad-
[minis]tered will usually be substantially less than for cattle
[beca]use of the difference in weight of the animals. For
[exam]ple, sheep may be given from 2 to 20 mg. of penicil-
[lin in] admixture with from 4 to 40 mg. of each macro-
[lide a]ntibiotic. As in the case of cattle, it is preferred
[to ad]minister these amounts at frequent intervals, either
[daily] or at least every two or three days. It is also
[prefe]rred to combine the antibiotic preparation with a
[feed] material for the sheep, although administration via
[drink]ing water or minerals also can be satisfactory.
[Alt]hough combinations of penicillin with a single
[macr]olide antibiotic, such as erythromycin or tylosin, are
[effect]ive, it is preferred to employ at least two macrolide
[antib]iotics in the combination. Outstanding results are
[achie]ved with preparations containing both erythromycin
[and t]ylosin in combination with penicillin. If desired,
[other] antibiotics can also be included. For example, the
[strept]omycins, or tetracyclines are suitable, as in chloram-
[pheni]col. From 1 to 4 parts by weight of such additional
[antibi]otics may be employed per part of penicillin.
[Sin]ce the amounts of the combined antibiotic prepara-
[tion] to be administered to each animal are relatively
[small], it is desirable to incorporate the antibiotics in a
[feed] material for the animal. Various feed materials can
[be us]ed for this purpose, such as grains, milling by-prod-
[ucts (]e.g. wheat middlings), oil seed extraction by-prod-
[ucts,] etc. Dry blending procedures will usually be satis-
[factor]y to achieve a uniform distribution of the antibiotics
[throu]ghout the feed material. The concentration of the
[antibi]otics in the feed material mixture will, of course,
[depen]d on how much of the particular feed material is
[to be] given to the animals per day. Usually, the amount
[of th]e mixture to be given will fall within the range
[of 0].1 lb. to 2 lbs. per day for cattle, or .1 to .5 lb.
[dail]y for sheep. For example, in one preferred formu-
[lation] for cattle, where the cattle are to be fed one
[poun]d of the feed mixture per day, each pound of the
[mixtu]re might contain 40 mg. of penicillin, 70 mg. of
[eryth]romycin, and 70 mg. of tylosin. It may be de-
[sirabl]e to pelletize the mixture to assure that a uniform
[distrib]ution of the antibiotic will be maintained and to
[facilit]ate the administration of the correct amounts to
[the an]imals. The antibiotic-containing feed material may
[be fed] alone or may be mixed with additional feed, ac-
[cordin]g to the diet of the animal. Since susceptibilty
[to blo]at is usually greatest when the animals are feeding
[on pa]sture, such as legume pasture, it will not ordinarily
[be po]ssible to combine the antibiotic preparation with
[the c]omplete ration for the animals, although this can
[be do]ne when the animals are being fed finely-ground
[grain] or other bloat-inducing diets under direct control
[of th]e cattle and sheep raiser. Another alternative is
[to inc]lude the antibiotics in the drinking water, salt, or
[miner]als supplied to the animals.
[As] used herein the term "cattle" refers to bovine ani-
[mals,] including calves, heifers, bulls, steers and cows of
[both b]eef cattle and dairy cattle breeds. By "ruminants"
is meant domestic ruminants, such as cattle and sheep.
The term "penicillin" is used in its generic sense, as
preferring to the various types of penicillin, such as peni-
cillin G, penicillin F, etc. The penicillin can be used
in its salt form, such as the soluble sodium and potassium
salts, or the relatively insoluble salts like procaine peni-
cillin. The term "erythromycin" is intended to include
all the closely related forms of this antibiotic such as
erythromycin B and C. Similarly, the term "strepto-
mycin" is used generically, as including dihydrostrepto-
mycin. Also, the term "tetracyclines" designates the close-
ly related group of antibiotics which includes chlortetra-
cycline, oxytetracycline, etc. The term "macrolide" is
used generically, but it is not intended to include the
polyene macrocyclic lactones or the polypeptide lactones.

This invention is further illustrated by the following
specific examples.

EXAMPLE 1

The following formulations are illustrative of antibiotic-
containing feed mixtures which may be used in practic-
ing the present invention.

*Formulation A*

| | Mg./lb. feed |
|---|---|
| Penicillin | 40 |
| Erythromycin | 70 |

*Formulation B*

| | |
|---|---|
| Penicillin | 40 |
| Tylosin | 70 |

*Formulation C*

| | |
|---|---|
| Penicillin | 80 |
| Erythromycin | 140 |
| Tylosin | 140 |

*Formulation D*

| | |
|---|---|
| Penicillin | 400 |
| Erythromycin | 700 |
| Tylosin | 700 |
| Chloramphenicol | 1000 |
| Oxytetracycline | 1000 |

It will be understood that the above formulations would
be combined with suitable feed material such as wheat
middlings, linseed meal, wheat bran, etc. For the bovine
group (e.g. diary cattle and beef cattle), where the
animals range in weight from 400 to 1000 lbs., Formu-
lations A and B should be used at the rate of 1 lb. per
animal per day, Formulation C at the rate of ½ lb. per
animal per day, and Formulation D at the rate of 1 lb.
per animal per day. For larger or smaller cattle, the
amount can be varied in proportion to weight. For sheep,
approximately one-fourth to one-fifth the amount for
cattle would be used.

EXAMPLE 2

A preparation for controlling bloat in cattle is pre-
pared by mixing 80 grams of penicillin, 140 g. of eryth-
romycin, 140 g. of tylosin, and 140 g. of streptomycin with
a ton (2000 lbs.) of wheat middlings containing 5%
molasses. To assure uniform distribution, the antibiotic
ingredients are first mixed with a small amount (10 to
20 lbs.) of the middlings and thereafter this pre-mix is
combined with the rest of the material. These steps can
be carried out by a dry mixing operation. If desired
other edible vegetable materials can be substituted, such
as corn, oats, linseed meal, wheat, bran, etc. The re-
sulting feed material is then suitable for administration
to cattle at the rate of approximately one pound per
animal per day.

EXAMPLE 3

Penicillin in the form of procaine penicillin G and
erythromycin were admixed with grain at levels of 46.7
and 46.7 mg. per pound of grain, respectively. One and
one-half pound of the grain mixture was fed dially per head to a group of 11 animals (average weight, approximately 660 pounds). An equal quantity of grain alone was given to a control group of 10 animals. The animals grazed relatively pure second-year alfalfa twice daily, from 7:00 to 10:00 a.m. and from 4:00 to 7:00 p.m. Bloat severity was observed continuously from horseback during each grazing period and for one hour afterwards, making a total of 4 hours. The evaluation was visual, using the Johnson scale as described in J. Animal Science, Vol. 17, pp. 893–902 (1958). This scale is summarized below in Table A.

TABLE A.—DESCRIPTION OF SCALE USED IN ASSIGNING BLOAT SCORES

Score: Description
- 0__ No bloat—no distention in left paralumbar fossa.
- 1__ Slight—slight distention in left paralumbar fossa; "puffy."
- 2__ Mild—marked distention in left paralumbar fossa; well rounded out between hip and rib on left side; little or no distention on right side.
- 3__ Moderate—well rounded out on left side, drum-like; full on right side; restless.
- 4__ Severe—both sides badly distended; left hip nearly hidden; skin tight; defecation; urination; incoordination; protruding anus; mild respiratory distress.
- 5__ Terminal—extreme abdominal distention; severe respiratory distress; cyanosis, prostration; death unless treated.

Over a 23 day period, 22 bloat scores of No. 3 or higher (moderate to terminal) were observed in the control group, while only 2 were observed in the treated group. A total of 19 observations of mild bloat (score No. 2) were also made for the control group as compared to only one such observation for the treated group.

In another test where erythromycin was fed at the same level, where the penicillin level was 23.3 mg. per pound of grain, and where spontin and novobiocin also were included, the results over a 26 day period were: control group, 15 cases of No. 3 or higher and 52 cases of No. 2; antibiotic group, one case of No. 3 and one of No. 2.

EXAMPLE 4

Penicillin, erythromycin, and tylosin were added to drinking water at appropriate levels so that each animal received a daily dose of 40, 70 and 70 mg., respectively. Treatment was continued daily for approximately 50 days. A group of 15 cattle (average weight, 592 pounds) received this treatment, while another group of 15 animals (average weight 639 pounds) was retained as controls. Grazing practices and evalution of the degree of bloat were similar to those indicated in Example 3.

Results of the trials are summarized in Table B. The combination was effective for the full period of treatment. A shown in Table B, considerable bloat was observed in the control animals.

TABLE B

| Group | No. of Animals | Mean Max. Bloat | No. Cases of Bloat of Score 3 or Above | Mean Daily Wt. Gain |
|---|---|---|---|---|
| Control | 15 | .254 | 41 | .83 |
| Treated | 15 | .041 | 4 | 1.48 |

EXAMPLE 5

Penicillin, erythromycin, tylosin, chloromycetin, and oxytetracycline was admixed with grain at levels of 10.0, 17.5, 17.5, 25.0, and 25.0 mg. per pound of grain, respectively. Two pounds of the grain mixture were fed daily per head to a group of 15 cattle (average weight, 582 pounds). An equal quantity of grain alone was given to a control group of similar size. The antibic levels were double about twelve days after initiation of treatment. The antibiotic combination was withdra approximately 92 days later, and the trials were termina after another week. Grazing practices and evaluation the degree of bloat were similar to those given in 1 ample 3.

Results are summarized in Table C. The lower le\ of antibiotics were adequate for the early period. higher antibiotic levels gave excellent control until treatment was withdrawn. Much bloat was observed lowing withdrawal of the antibiotic treatment. As sho in Table C, considerable bloat was observed in the c trol animals.

TABLE C

| Group | No. of Animals | Mean Max. Bloat | No. Cases of Bloat of Score 3 or Above | Mean I Wt. G |
|---|---|---|---|---|
| Control | 16 | .362 | 81 | |
| Treated | 15 | .037 | 2 | |

EXAMPLE 6

A preparation for controlling bloat in ruminants be prepared by mixing the following: 10 lb. $CaCO_3$ lb. $CaHPO_4$, 10 lb. NaCl, 5 grams penicillin, 9 gr erythromycin, and 9 grams tylosin. This mineral mix is suitable for feeding to cattle or sheep.

While in the foregoing specification this invention been described in relation to certain specific embodim thereof and many details have been set forth for the pose of illustration, it will be apparent to those sk in the art that the invention is susceptible to other bodiments and that many of the details described he can be varied considerably without departing from basic principles of the invention.

We claim:

1. A preparation for controlling bloat in rumin. comprising penicillin, erythromycin, and tylosin in mixture with a ruminant feed material, said prepar: containing from .5 to 5 parts by weight each of e romycin and tylosin per part of penicillin.

2. A preparation for controlling bloat in rumin comprising penicillin, erythromycin, and tylosin in mixture with a ruminant feed material, said prepar: containing from 1 to 3 parts by weight each of e romycin and tylosin per part of penicillin, said prej tion also containing at least one other antibiotic sel from the group consisting of streptomycin, tetracy( and chroamphenicol; and other antibiotics being ployed in amounts of from 1 to 4 parts by weigh part of penicillin.

3. A preparation for controlling bloat in rumir comprising penicillin together with erythromycin tylosin, said preparation containing from .5 to 5 by weight each of erythromycin and tylosin per pa penicillin.

4. A preparation for controlling bloat in rumir comprising penicillin together with erythromycin tylosin, said preparation containing from 1 to 3 par weight each of erythromycin and tylosin per pa penicillin.

5. A preparation for controlling bloat in rumii comprising a mixture of at least three antibiotics formly dispersed in a carrier administerable to rumii said antibiotics including in combination peni erythromycin, and tylosin, said preparation cont: from .5 to 5 parts by weight each of said erythroi and tylosin per part of penicillin.

6. The preparation of claim 5 in which said pr( tion also contains at least one other antibiotic se from the group consisting of streptomycin tetrac) and chloramphenicol, said antibiotics being emplo} nts of from 1 to 4 parts by weight per part of illin.

The method of controlling bloat in cattle for an ded period of time while said cattle are continuing a bloat-inducing diet, comprising orally administer- said cattle a preparation containing penicillin, erythcin, and tylosin, from .5 to 5 parts by weight each id erythromycin and tylosin being present per part nicillin, said preparation being administered at the of 10 to 100 mg. of penicillin per animal per 24

A method for controlling bloat in cattle for an ded period of time while said cattle are continuing t a bloat-inducing diet, comprising orally administo said cattle a preparation containing penicillin, romycin, and tylosin uniformly dispersed in a cardministerable to cattle, from 1 to 3 parts by weight of said erythromycin and said tylosin being present art of penicillin, said preparation being administered rate of 10 to 100 mg. of penicillin per animal per urs.

The method of claim 8 wherein said preparation contains at least one other antibiotic selected from roup consisting of streptomycin, tetracycline, and amphenicol, said other antibiotics being employed nounts of from 1 to 4 parts by weight per part of illin.

A method of controlling bloat in cattle for an ded period of time while said cattle are continuing a bloat-inducing diet, comprising orally administer- said cattle a preparation containing a plurality of otics uniformly dispersed in a carrier administerable ittle, said antibiotics including penicillin, erythcin, tylosin, and at least one other antibiotic selected the group consisting of streptomycin, tetracycline, chloramphenicol, said preparation containing from 5 parts by weight each of erythromycin and tylosin art of penicillin, said other antibiotics being emd in amounts of from 1 to 4 parts by weight per of penicillin, said administration being repeated a lity of times at spaced intervals and each administra- being at the rate of 10 to 100 mg. of penicillin per il per 24 hours.

The method of controlling bloat in sheep for an ded period of time while said sheep are continuing a bloat-inducing diet, comprising orally administero said sheep a preparation containing penicillin, romycin, and tylosin, from .5 to 5 parts by weight of said erythromycin and tylosin being present per part of penicillin, said preparation being administered at the rate of 2 to 20 mg. of penicillin per animal per 24 hours.

12. A method for controlling bloat in sheep for an extended period of time while said sheep are continuing to eat a bloat-inducing diet, comprising orally administering to said sheep a preparation containing penicillin, erythromycin, and tylosin uniformly dispersed in a carrier administerable to sheep, from 1 to 3 parts by weight each of said erythromycin and said tylosin being present per part of penicillin, said preparation being administered at the rate of 2 to 20 mg. of penicillin per animal per 24 hours.

13. The method of claim 12 wherein said preparation also contains at least one other antibiotic selected from the group consisting of streptomycin, tetracycline, and chloramphenicol, said other antibiotics being employed in amounts of from 1 to 4 parts by weight per part of penicillin.

14. A method of controlling bloat in sheep for an extended period of time while said sheep are continuing to eat a bloat-inducing diet, comprising orally administering to said sheep a preparation containing a plurality of antibiotics uniformly dispersed in a carrier administerable to sheep, said antibiotics including penicillin, erythromycin, tylosin, and at least one other antibiotic selected from the group consisting of streptomycin, tetracycline, and chloramphenicol, said preparation containing from .5 to 5 parts by weight each of erythromyic and tylosin per part of penicillin, said other antibiotics being employed in amounts of from 1 to 4 parts by weight per part of penicillin, said administration being repeated a plurality of times at spaced intervals and each administration being at the rate of 2 to 20 mg. of penicillin per animal per 24 hours.

References Cited by the Examiner

Barrentine, J Animal Science, Vol. 15, No. 2, May 1956, pages 440–446.

Miller, Journal of Dairy Science, Vol. 45, 1962, pages 994–998.

Powell, Antibiotics and Chemotherapy, Vol. 3, 1953, pages 701 to 708.

Wallace, Antibiotics and Chemotherapy, Vol. 3, No. 3, March 1953, pages 271 and 276.

JULIAN S. LEVITT, Primary Examiner.

MORRIS O. WOLK, LEWIS GOTTS, Examiners.

UNITED STATES PATENT OFFICE
CERTIFICATE OF CORRECTION

Patent No. 3,234,086 February 8, 1966

Paul A. Hartman et al.

It is hereby certified that error appears in the above numbered patent requiring correction and that the said Letters Patent should read as corrected below.

Column 6, line 52, for "chroamphenicol; and" read -- chloramphenicol, said --; column 8, line 29, for "erythromyic" read -- erythromycin --.

Signed and sealed this 17th day of January 1967.

(SEAL)
Attest:

ERNEST W. SWIDER
Attesting Officer

EDWARD J. BRENNER
Commissioner of Patents